United States Patent Office 2,967,875
Patented Jan. 10, 1961

2,967,875

PROCESS FOR THE PRODUCTION OF NEW ADDITION PRODUCTS FROM ALUMINIUM HYDROCARBONS AND ACETYLENE OR ACETYLENE DERIVATIVES

Günther Wilke, Mulheim (Ruhr), Germany, assignor to Karl Ziegler, Mulheim (Ruhr), Germany No Drawing. Filed Feb. 15, 1956, Ser. No. 565,554

Claims priority, application Germany Feb. 15, 1955

12 Claims. (Cl. 260—448)

The present invention relates to the production of new addition products from aluminum hydrocarbons and acetylene or acetylene derivatives.

Reactions between ethylene hydrocarbons and aluminum compounds are known. It has now been found that new addition products can be produced from aluminum hydrocarbons and acetylene or acetylene derivatives by reacting 1 or 2 mols of aluminum hydrocarbon of the formula $AlR_2R'$, in which R is a hydrocarbon radical and R' is a hydrocarbon radical or hydrogen, with acetylene or acetylene derivatives of the formula $$R'-C\equiv C-R''$$

in which R'' is a hydrocarbon radical, hydrogen or the group $-AlR_2$, at room temperature up to 60° C.

For example, dialkyl aluminum hydrides and especially diethyl aluminum hydride and/or diisobutyl aluminum hydride readily add to any acetylene. The addition takes place at temperatures of between room temperature and about 50° C. The addition proceeds in accordance with the following equations:

(a) Diisobutyl aluminum hydride+phenyl acetylene $$(C_4H_9)_2AlH + H.C\equiv C-C_6H_5 = (C_4H_9)_2Al-CH=CH-C_6H_5$$
iso (b) Diisobutyl aluminum hydride+hexine-(1)

$$(C_4H_9)_2AlH + HC\equiv C-C_4H_9 = (C_4H_9)_2Al-CH=CH-C_4H_9$$
iso (c) Diisobutyl hydride+hexine-(3)

$$(C_4H_9)_2AlH + C_2H_5-C\equiv C-C_2H_5 = (C_4H_9)_2Al-\overset{C_2H_5}{\underset{}{C}}H=CH-C_2H_5$$
iso (d) Diisobutyl hydride+acetylene $$(C_4H_9)_2AlH + HC\equiv CH = (C_4H_9)_2Al-CH=CH_2$$
iso While the reaction products according to (a), (b) and (c) can be easily separated, this is possible only with difficulty in the case of the reaction product according to Equation (d) since further reactions follow.

The unsaturated addition products which, for example, are obtained according to the above equations can be added once again to dialkyl aluminum hydrides. This repeated addition to form saturated addition products occurs preferably at temperatures between 50° and 60° C. and proceeds more slowly than the first addition to form an unsaturated addition product. An example of an addition of this kind is the reaction of diisobutyl aluminum hydride and hexine-(1) in a molar ratio of 2:1.

$$HC\equiv C-C_4H_9 \xrightarrow{(C_4H_9)_2AlH} (C_4H_9)_2Al-CH=CH-C_4H_9 \xrightarrow{(C_4H_9)_2AlH}$$

$$\begin{array}{c}(C_4H_9)_2Al\\ \diagdown\\ CH-CH_2-C_4H_9\\ \diagup\\ (C_4H_9)_2Al\end{array}$$

Dialkyl aluminum hydrides other than those used in the first phase may, of course, also be used in the second phase for the addition to form saturated addition products of this kind. As may be seen from the above formula, the reaction products are saturated aluminum compounds bearing two aluminum atoms at the same carbon atom at individual points of the molecule. If the direction of the second reaction is considered as being not completely ensured, the saturated aluminum compounds contain the two aluminum atoms at least at one and the same carbon chain.

$$HC\equiv C-C_4H_9 \xrightarrow{(C_4H_9)_2AlH} (C_4H_9)_2Al-CH=CH-C_4H_9 \xrightarrow{(C_4H_9)_2AlH}$$

$$\begin{array}{c}Al(C_4H_9)_2\\ |\\ (C_4H_9)_2Al-CH_2-CH-C_4H_9\end{array}$$

The addition of aluminum trialkyl to any olefin desired has been disclosed in the German Patents 878,560 and 917,006. It has been found that the behavior of the AlC bond is similar to that of the AlH bond in the dialkyl aluminum hydrides and, consequently, the addition of aluminum trialkyl to any acetylene desired is possible. There have been added, for example:

(a) Aluminum triethyl+acetylene $$(C_2H_5)_2Al-C_2H_5 + HC\equiv CH$$
$$= (C_2H_5)_2Al-CH=CH-C_2H_5$$

(b) Aluminum triisobutyl+acetylene $$(C_4H_9)_2Al-C_4H_9 + HC\equiv CH = (C_4H_9)_2Al-CH=CH-C_4H_9$$
iso                                     iso It appeared, moreover, that the addition product from the addition of central acetylenes and aluminum dialkyl hydride reacts with a further molecule of acetylene or an acetylene compound at high temperatures. This further addition takes place exclusively at the Al—C bond of the unsaturated radical, e.g. according to the following equation:

$$(C_4H_9)_2AlH + C_2H_5-C\equiv C-C_2H_5 \longrightarrow$$

$$(C_4H_9)_2Al-\underset{H}{\overset{C_2H_5}{\underset{|}{C}}}-C_2H_5 \xrightarrow{C_2H_5-C\equiv C-C_2H_5}_{2\text{ hrs. } 90° \text{ C.}}$$

$$(C_4H_9)_2Al-\overset{C_2H_5}{\underset{}{C}}=\overset{C_2H_5}{\underset{}{C}}-\overset{C_2H_5}{\underset{}{C}}=\overset{C_2H_5}{\underset{}{C}}H \xrightarrow{water} HC=\overset{C_2H_5}{\underset{}{C}}-\overset{C_2H_5}{\underset{}{C}}=\overset{C_2H_5}{\underset{}{C}}H$$

Decomposition of this product results in 1,2,3,4-tetraethyl butadiene.

It is also possible under suitable conditions, i.e. at correspondingly elevated temperatures of, for example, 140° C. to add a third mol of acetylene or acetylene derivative. This addition is perhaps represented by the following reaction scheme:

$$(C_4H_9)_2Al-\overset{C_2H_5}{C}=\overset{C_2H_5}{C}-\overset{C_2H_5}{C}=\overset{C_2H_5}{C}H \xrightarrow{\text{hexine-(3)}}$$

$$(C_4H_9)_2Al-\overset{C_2H_5}{C}=\overset{C_2H_5}{C}-\overset{C_2H_5}{C}=\overset{C_2H_5}{C}-\overset{C_2H_5}{C}= \longrightarrow$$

$$(C_4H_9)_2Al-H + \begin{array}{c}C_2H_5\\ C_2H_5-\hexagon-C_2H_5\\ C_2H_5-\hexagon-C_2H_5\\ C_2H_5\end{array}$$

The interstage of the aluminum-organic compound with a threefold unsaturated radical is not accessible in this process step since there takes place immediately a cyclization to form a hexa-substituted benzene derivative (hexaethyl benzene in the above reaction scheme). When integrating the above two reaction schemes, it can be seen that the described trimerization with subsequent cyclization represents a catalytic process since the dialkyl aluminum hydride charged at the beginning, after ring closure has taken place, appears again unchanged in the equation. Thus, it is possible with a few ml. of dialkyl aluminum hydride to convert any quantity desired of central acetylenes into hexa-substituted benzenes. Substituted benzenes of this kind are suitable to be charged in various manners in commercial synthesis processes.

The reaction products from the addition of aluminum trialkyls to acetylene or acetylene compounds may also be added to dialkyl aluminum hydrides. The addition occurs, for example, according to the following equation:

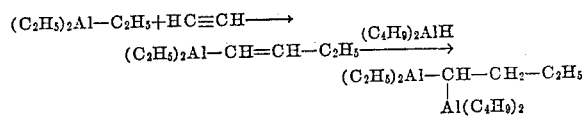

It is also possible in accordance with the invention to add an acetylene to a dialkyl aluminum hydride in the molar ratio of 1:1 and to add 1 mol aluminum trialkyl to the unsaturated addition product thereby obtained. For example:

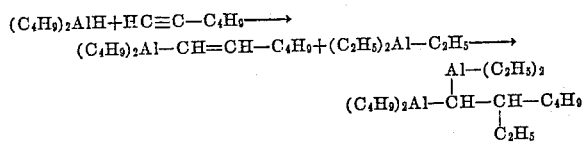

In accordance with the invention, any acetylene is suited for the addition irrespective of its specific constitution, as, for example, the acetylene Hexine-(1)   $HC{\equiv}C-CH_2-CH_2-CH_2-CH_3$
Hexine-(3)   $CH_3-CH_2-C{\equiv}C-CH_2-CH_3$ and Phenyl acetylene $C_6H_5-C{\equiv}CH$ Other suitable reactive starting materials are aluminum compounds of the formula $R_2Al-C{\equiv}CR$. These aluminum alkyls with a triple bond in the molecule are easily obtained according to the following equation:

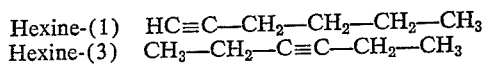
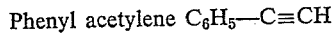

When using the above-mentioned aluminum alkyls with a triple bond in the molecule, it is possible, for example, to add 1 mol of such a compound to 1 mol of dialkyl aluminum hydride or aluminum trialkyl as, for example:

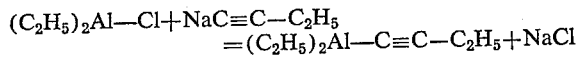

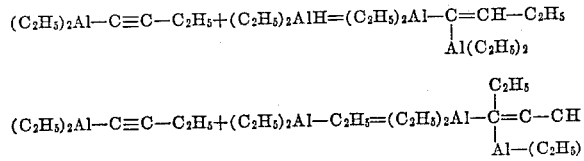

A second molecule of dialkyl aluminum hydride may then be added to the unsaturated reaction product obtained according to the above equations to form a saturated reaction product.

The following examples are given by way of illustration and not limitation:

*Example 1*

110 grams of phenyl acetylene, under nitrogen, are weighed into a flask fitted with a dropping funnel and a stirrer. A thermometer is directly immersed into the liquid. The gas evolved in the reaction is collected in a gas holder. 76 grams of diisobutyl aluminum hydride are dropped into the flask in the course of 7–8 hours. Upon each addition, the temperature increases slowly. The maximum temperature is 42° C. A quantity of about 1000 cc. of gas is evolved ($H_2$). The excess phenyl acetylene is sucked off under vacuum. The increase in weight is 56 grams (the theoretical amount being 54.6 grams). After 2–3 hours, the reaction product crystallizes out. It is recrystallized from pentane at —15° to —20° C. There are formed yellow tufty crystal needles having an aluminum content of 11% (the theoretical content being 11.1%).

*Example 2*

The reaction is effected with hexine-(1) in the same manner as described in Example 1. However, an evolution of gas does not take place in this case. 51.5 grams of diisobutyl aluminum hydride, at a maximum temperature of 45° C., are allowed to drop within 5 hours into 70 grams equal to 100 cc. of hexine-(1). The excess hexine is sucked off. The increase in weight amounts to 30 grams (the theoretical value being 29.8 grams). The reaction product shows an aluminum content of 11.6% (the theoretical amount being 12.0%). Decomposition with alcohol and subsequent fractionation of the decomposition products yields hexene-(1) contaminated with less than 3% of hexine as shown by infrared analysis.

*Example 3*

Hexine-(3) is reacted with diisobutyl aluminum hydride in the manner described in Examples 1 and 2. However, an absorption of only 70% of the theory is obtained after having sucked off the excess hexine-(3). Decomposition of the reaction product and subsequent appropriate processing results in pure cis-hexene-(3) as shown by infrared analysis.

*Example 4*

152.5 grams of diisobutyl aluminum hydride, under nitrogen, are weighed into a cylindrical vessel provided with a stirrer, thermometer and a gas inlet pipe. The hydride is carefully heated to 40–50° C. and then washed, and finally organo-metallically dried acetylene is introduced while vigorously stirring. Acetylene in amount of 15.5 gms. is absorbed within 5–7 hours. The determination of aluminum in the product thus obtained shows 16.7% of aluminum (the theoretical value for the addition of diisobutyl aluminum hydride:acetylene=2:1 being 16.7% of aluminum). Decomposition and processing of this product results in isobutane and 2-methyl pentane in addition to very little ethane and some hydrogen.

*Example 5*

The diisobutyl hexenyl aluminum (81.5 grams) obtained according to Example 2 is reacted with additional 51.5 grams of diisobutyl aluminum hydride. In this reaction, a further increase in temperature is not noticed. The mixture is maintained for 3 hours at 80° C. The decomposition of the substance thus prepared yields isobutane and hexane contaminated with traces of hexine or hexene.

*Example 6*

242 grams of aluminum triethyl, under nitrogen, are weighed into a round-bottomed flask provided with stirrer, gas inlet pipe, thermometer and gas outlet pipe. Acetylene which has been treated as described in Example 4 is introduced while vigorously stirring. The temperature increases slowly from room temperature to 50–60° C. The temperature is maintained in this range by cooling. Toward the end of the reaction the flask is carefully heated. In this manner, 56 grams of acetylene are absorbed in the course of about 10 hours (55.5 grams correspond to a molar ratio of aluminum triethyl to acetylene of 1:1). The reaction is completed in this temperature range if 1 mol acetylene has been added to 1 mol aluminum triethyl. The analysis of this crude product shows an aluminum content of 18.6% (the theoretical value of diethyl-butenyl aluminum being 19.3%). Decomposition with alcohol results in a gas including about 29.4% of butene-(1) and 70.6% of ethane as shown by analysis.

*Example 7*

147 grams of aluminum triisobutyl are reacted with acetylene in the same manner described in Example 6. Intensive cooling is required to keep the temperature at 50–60° C. 18 grams of acetylene are absorbed in the course of 2–3 hours (the theoretical value being 19.3%).

The substance thus obtained crystallizes while being cooled. The determination of aluminum shows 11.8% of aluminum (the theoretical value being 12.05%). Decomposition with alcohol yields 4-methyl pentene-(1) in addition to isobutane.

*Example 8*

114 grams of aluminum triethyl are heated to 80–90° C. and 35 grams of diethyl butenyl aluminum are allowed to drop in within 3 hours. The mixture is heated for another hour. By decomposition with alcohol, there are separated 3-methyl pentane as the main product and small amounts of higher boiling portions in addition to ethane and little butene -(1).

*Example 9*

70 grams of diethyl-butenyl aluminum and 71 grams of diisobutyl aluminum hydride are heated for 3–4 hours at 60–80° C. Decomposition with alcohol of the gases thus obtained results only in saturated hydrocarbons, ethane, butane, isobutane as shown by analysis.

*Example 10*

23 grams of sodium are dissolved in 0.5 liter of liquid anhydrous ammonia. Butine-(1) is introduced into this solution which has a temperature of −40° to −50° C. until the solution has turned to white. Ammonia, butine, and butene formed in the reaction are blown off and the residues are removed at 80° C. in a nitrogen stream. Traces of adhering gases are sucked off at 80° C. with the oil pump. The pure sodium salt of butine is dissolved in 500 cc. of anhydrous hexane and stirred until it has the form of a fine suspension. Diethyl aluminum monochloride in amount of 115 grams is now allowed to drop into this suspension. This results in rapid heating to a temperature close to the boiling point of hexane. After continued heating for another hour to about 60° C. the hexane is distilled off under vacuum. Following this, the diethyl-butenyl aluminum is distilled under high vacuum at $10^{-2}$ to $10^{-3}$ mm. and at a constant boiling point of 72–74° C. from the salt masses formed by the reaction. The yield is more than 90%. Analysis: 90.4% aluminum (the theoretical content being 90.5%).

*Example 11*

23 grams of diethyl-butenyl aluminum, under nitrogen, are mixed with 23 grams of diisobutyl aluminum hydride. After a few seconds, the temperature increases slowly and reaches 40° C. This temperature remains constant for some time. After cooling, an infrared spectrum is taken from this substance. This spectrum shows that diisobutyl aluminum hydride is no longer present in the mixture, but the characteristic bands of C≡C and C=C are noticeable very distinctly, i.e. the reaction has partially continued so that hydride had been added to "ene" compounds already formed.

The reaction with additional 23 grams of diisobutyl aluminum hydride for 3–4 hours at 50°–60° C. finally gives an infrared spectrum which shows no hydride and only traces of C≡C and C=C bands. Decomposition and analysis of the gases results in ethane, isobutane and butane.

*Example 12*

35 grams of diisobutyl aluminum hydride and 45 grams of hexine-(3) are heated for 2 hours at 90° C. Thereafter, the excess hexine-(3) is sucked off under vacuum and the residue is decomposed with alcohol while cooling with ice. The hydrocarbon is processed in the usual manner and distilled. $B.P._{19\ mm.}=87°$ C. $n_D^{20}=1.4612$. Yield: 23 grams of 1,2,3,4-tetraethyl butadiene corresponding to 77% of the hexine converted.

*Example 13*

30 grams of 1,2-diphenyl acetylene dissolved in 25 cc. of hexane are allowed to drop into 22 grams of diisobutyl aluminum hydride heated to 85° C. and the mixture is subsequently heated for 4 hours at 85° C. The solution diluted with benzene is decomposed with alcohol and evaporated after processing. The residue is recrystallized from glacial acetic acid. Melting point of the product is 181–182° C. The yield amounts to 23 grams of 1,2,3,4-tetraphenyl butadiene corresponding to 77% of the 1,2-diphenyl acetylene charged.

*Example 14*

10 grams of hexine-(3) and 1 cc. of diisobutyl aluminum hydride are heated for 48 hours at 140° C. There is noticed an increase in pressure originating from evolving isobutene. The reaction product is freed from the aluminum-organic compound by washing with alcohol and dilute sulfuric acid. Recrystallization from acetone results in a 80–90% yield of hexaethyl benzene having a melting point of 126°–127° C.

*Example 15*

20 grams of 1,2-diphenyl acetylene dissolved in 50 cc. of xylene are heated for 48 hours in the presence of 1 cc. of diisobutyl aluminum hydride at 140° C. Upon processing there is obtained a 80–90% yield of hexaphenyl benzene having a melting point of 422°–424° C.

What I claim is:

1. Process for the production of organic aluminum addition products, which comprises contacting an organic aluminum compound having the formula $AlR_2R'$, in which R is a hydrocarbon radical and R' is a member selected from the group consisting of hydrogen and hydrocarbon radicals with an acetylenic hydrocarbon compound having the formula $R'-C≡C-R''$, in which R'' is a member selected from the group consisting of hydrogen, hydrocarbon radicals, and the group $-AlR_2$ at a temperature ranging from about room temperature to about 60° C. and recovering the addition product formed.

2. Process according to claim 1, in which said contacting is effected with substantially equal molecular quantities of said aluminum compound and said acetylenic hydrocarbon.

3. Process according to claim 1, in which said contacting is effected with said aluminum compound and said acetylenic hydrocarbon in a molar ratio of about 2:1.

4. Process according to claim 1, which includes contacting said formed addition product with an organic aluminum compound having said formula and recovering the addition product formed containing at least 2 aluminum atoms per molecule.

5. Process according to claim 1, in which said aluminum compound is diethyl aluminum hydride.

6. Process according to claim 1, in which said aluminum compound is diisobutyl aluminum hydride.

7. Process according to claim 1, in which said acetylenic hydrocarbon is phenyl acetylene.

8. Process according to claim 1, in which said acetylenic hydrocarbon is hexine-1.

9. Process according to claim 1, in which said acetylenic hydrocarbon is hexine-3.

10. Process according to claim 1, in which said acetylenic hydrocarbon has an intermediate triple bond and which includes reacting said addition product formed with an acetylenic hydrocarbon having said formula.

11. Process according to claim 10, which includes decomposing the reaction product formed with water.

12. Process according to claim 1, in which a total of at least 3 mols of said acetylenic hydrocarbon is added per mol of said aluminum compound, and in which the addition of the second mol of acetylenic hydrocarbon is effected at a temperature between about 50 and 60° C. and the addition of the third mol is effected at a temperature of about 140° C. to thereby obtain cyclization of said organic aluminum addition product formed and the splitting off therefrom of a substituted benzene derivative.

References Cited in the file of this patent

FOREIGN PATENTS 917,006    Germany _____ Aug. 23, 1954

OTHER REFERENCES

Nelson: Chemical Abstracts, vol. 32, pp. 3756–57 (1938).

European Scientific Notes, vol. 6, No. 13, Office of Naval Research, London, July 1, 1952, p. 178 relied on.

J. Chem. Soc. (1954), pages 1634 to 1638; abstracted in Chemical Abstracts 49 (1953), column 4495i.